UNITED STATES PATENT OFFICE.

EDWARD T. WILLIAMS, OF BOSTON, MASSACHUSETTS.

FOOD COMPOUND AND METHOD OF PREPARING THE SAME.

No. 811,466.  Specification of Letters Patent.  Patented Jan. 30, 1906.

Application filed July 17, 1905. Serial No. 270,121.

*To all whom it may concern:*

Be it known that I, EDWARD T. WILLIAMS, a citizen of the United States, residing at Boston, in the county of Suffolk and State of Massachusetts, have invented new and useful Improvements in Food Compounds and Methods of Preparing the Same, of which the following is a specification.

My invention relates to food compounds and the method of preparing the same, the object being the production of a food compound mainly of animal tissue or matter which will withstand the action of air and moisture at ordinary natural temperatures, such as are found between the equator and the poles.

The compound consists of any animal tissue or matter—such as animal flesh, brains, livers, spleens, fish, fishes' roes, fowl, eggs, &c.—combined with certain percentages of stearin and a softer fat or fat which melts at a lower temperature, such as beef-tallow, mutton-tallow, lard, oleomargarin, butterin, &c.

The method of preparing the food in general is as follows: First, animal tissue, flesh, or matter is subjected to the action of steam at a temperature of 212° Fahrenheit or to a dry heat for a suitable period of time—fifteen minutes, more or less—to destroy any germs of putrefaction which may be present; secondly, the tissue, flesh, or matter is then comminuted in any suitable way to form a hash; thirdly, the same is thoroughly mixed while hot with approximately equal parts of stearin and the softer fat; finally, the mixture is placed while hot in suitable vessels, such as jars or cans, and hermetically sealed. Upon cooling, the entire product forms a solid mass or cake which is impervious to air and moisture and is capable of withstanding a relatively high temperature without change or deterioration.

In preparing the stearin and softer fat prior to their mixture with the comminuted animal tissue it is advisable to melt them under a gentle heat, as from 150° to 160° Fahrenheit, and to raise the temperature for a few minutes to 212° Fahrenheit, so as to destroy all putrefactive germs. The amount of liquid fat, stearin, and the softer fat to be added to the sterilized hash may be ten per cent., more or less. A sufficient quantity, however, must be used to bind the hash together in a relatively hard or solid mass, so as to form a coating around and between the particles thereof and exclude air and moisture.

The treatment of the several different animal tissues or matter in preparing the food may be varied specifically, as follows: Tissue of relative soft consistency—such as brains, spleen, and livers—may be hardened by steaming, so as to coagulate the liquid albumen, and thus allow of their being comminuted or hashed with facility. Eggs may be broken and their contents dropped into boiling water and allowed to remain therein for several minutes or till the yelks become perfectly hard. When removed, they may be reduced to a hash by forcing the same through a sieve or be changed to the desired form in any other manner. Meat, fish, and fowl should preferably be broiled, roasted, baked, or treated in any other way till they are "done through," not particularly for the purpose of cooking them, but to destroy the germs of putrefaction.

As is well known, stearin is an animal fat, solid at all ordinary temperatures and which melts at approximately 135° Fahrenheit. Being solid under natural temperatures, it is not liable to become rancid.

Some of the softer fats which may be used have approximately the following melting-points: beef-tallow, 105° to 115° Fahrenheit; mutton-tallow, 110° to 120° Fahrenheit; lard, 100° Fahrenheit; butter, 95° to 100° Fahrenheit; oleomargarin, 90° to 100° Fahrenheit; butterin, 90° to 100° Fahrenheit.

By thoroughly mixing stearin and one of the softer fats in proper proportions and under heat and then allowing them to cool a solid homogeneous mass or product is secured which will resist the highest natural temperatures without melting. Any one of these products consequently will withstand all ordinary climatic changes and conditions without deteriorating, and hence be especially adapted for the preservation of animal tissues when mixed therewith, inasmuch as each is impervious to air and moisture and will not become rancid.

When mixed with the hash, as hereinbefore described, the product or food will retain its normal condition very well for a time even when removed from the cans or jars.

From the foregoing it becomes obvious that I have produced a food which fulfils the conditions set forth as the object of my invention. Animal fats—such as tallow, lard, butter and its imitations—which have low melting-points are extremely liable to become rancid, an effect due to the formation of certain acids and other products of decomposition in them as the result of exposure to air and moisture. This decomposition is caused by germs from the air, the growth of which is promoted by heat and moisture. Now when these fats are melted with stearin at a temperature of 175° Fahrenheit or more all the germs are destroyed, and when the compound is mixed with sterilized animal tissue and the mass sets and is placed in vessels and sealed the fats will not undergo decomposition, and consequently will not become rancid. The purpose of adding the stearin is therefore not only to stiffen the fat and raise its melting-point, but also to prevent it from becoming rancid.

What I claim is—

1. A food compound comprising animal tissue or matter, stearin, and a fat having a melting-point lower than the melting-point of stearin.

2. A food compound comprising comminuted animal tissue or matter, stearin, and a fat having a melting-point lower than the melting-point of stearin; the stearin and other fat being thoroughly mixed with the comminuted animal tissue or matter.

3. A food compound comprising comminuted animal tissue or matter, stearin, and tallow; the said animal tissue, stearin and tallow being thoroughly mixed; in substance as set forth.

4. The method of preparing a food compound consisting in first, subjecting animal tissue to a temperature of 212° Fahrenheit to destroy the germs of putrefaction; and secondly, mixing the said animal tissue with a sterilized compound of stearin and a fat of a lower melting-point than stearin.

5. The method of preparing a food compound consisting in first, subjecting animal tissue to a temperature of 212° Fahrenheit to destroy the germs of putrefaction; comminuting the animal tissue; and finally mixing with the said comminuted tissue, sterilized stearin and tallow.

In testimony whereof I affix my signature in presence of two witnesses.

EDWARD T. WILLIAMS.

Witnesses:
THOMAS PARKER,
HARRY C. BYRNE.